US012615183B2

(12) United States Patent
Keul et al.

(10) Patent No.: US 12,615,183 B2
(45) Date of Patent: Apr. 28, 2026

(54) NETWORK CONFIGURATION IN INDUSTRIAL AUTOMATION SYSTEMS

(71) Applicant: ABB Schweiz AG, Baden (CH)

(72) Inventors: Thomas Keul, Freigericht (DE); Ralf Jeske, Petershagen (DE); Stefan Pook, Minden (DE)

(73) Assignee: ABB Schweiz AG, Baden (CH)

( * ) Notice: Subject to any disclaimer, the term of this patent is extended or adjusted under 35 U.S.C. 154(b) by 15 days.

(21) Appl. No.: 18/934,778

(22) Filed: Nov. 1, 2024

(65) Prior Publication Data

US 2025/0150337 A1 May 8, 2025

(30) Foreign Application Priority Data

Nov. 2, 2023 (EP) ..................................... 23207349

(51) Int. Cl.
H04L 41/0806 (2022.01)
G05B 19/418 (2006.01)
(52) U.S. Cl.
CPC ...... H04L 41/0806 (2013.01); G05B 19/4185 (2013.01)
(58) Field of Classification Search
CPC . H04L 41/0806; H04L 41/0886; H04L 45/24; H04L 45/64; H04L 63/20; H04L 41/0895; H04L 41/145; H04L 41/40; H04L 45/28; H04L 45/38; H04L 63/0227; H04L 1/22; H04L 12/40176; H04L 12/40189; H04L 12/437; H04L 2012/4026; H04L 2101/622; H04L 41/0823; H04L 41/083;
(Continued)

(56) References Cited

U.S. PATENT DOCUMENTS 5,995,916 A * 11/1999 Nixon ................ G05B 23/0208
702/182
6,098,116 A * 8/2000 Nixon ................ G05B 19/0426
710/10
(Continued)

FOREIGN PATENT DOCUMENTS

JP 4874225 B2 2/2012

OTHER PUBLICATIONS

Antonova et al., "Communication Redundancy for Substation Automation," *2011 64th Annual Conference for Protective Relay Engineers*, 344-355 (Apr. 11-14, 2011).
(Continued)

*Primary Examiner* — Greg C Bengzon
(74) *Attorney, Agent, or Firm* — Fitch Even Tabin & Flannery LLP

(57) ABSTRACT

A method for network configuration in an industrial automation system includes obtaining, by a process control system comprising a plurality of network devices each associated with a network switch, network configuration data; and using the network configuration data to configure the network devices. The network configuration data identifies at least a redundancy protocol to be used by each of the network devices. Obtaining the network configuration data comprises activating one or more network connections of the network switches as a minimum number of network connections for obtaining the network configuration data, and receiving the network configuration data via the one or more activated network connections.

10 Claims, 3 Drawing Sheets

(58) Field of Classification Search

CPC ............. H04L 41/0836; H04L 41/0869; H04L 41/122; H04L 41/14; H04L 41/142; H04L 41/149; H04L 41/20; H04L 41/5003; H04L 41/5054; H04L 43/08; H04L 43/0811; H04L 43/0876; H04L 43/20; H04L 45/02; H04L 45/306; H04L 45/74; H04L 47/24; H04L 49/351; H04L 49/356; H04L 61/10; H04L 61/103; H04L 63/0218; H04L 63/0428; H04L 63/08; H04L 63/166; H04L 67/1095; H04L 67/1097; H04L 67/125; H04L 67/133; H04L 69/14; H04L 69/22; H04L 69/40; G05B 19/042; G05B 19/058; G05B 19/4065; G05B 19/4184; G05B 19/4185; G05B 2219/14132; G05B 2219/24192; G05B 2219/31122; G05B 2219/33144; G05B 2219/33235; G05B 2219/33328; G05B 2219/39169; G05B 9/03; G06F 8/20; G06F 9/4401; G06F 9/4405; G06F 9/4408; G06F 9/451; G06F 9/547

See application file for complete search history.

(56) References Cited

U.S. PATENT DOCUMENTS

| | | | | |
|---|---|---|---|---|
| 11,336,564 | B1 * | 5/2022 | Mullis | H04L 61/10 |
| 11,411,807 | B2 * | 8/2022 | Kozhaya | H04L 41/0659 |
| 2010/0110904 | A1 * | 5/2010 | Wimmer | H04L 1/22 |
| | | | | 370/248 |
| 2014/0025833 | A1 * | 1/2014 | Kiessling | H04L 45/48 |
| | | | | 709/228 |
| 2014/0040657 | A1 * | 2/2014 | Kiessling | G06F 11/0709 |
| | | | | 714/4.1 |
| 2017/0099213 | A1 * | 4/2017 | Bruckner | H04L 45/22 |
| 2017/0242418 | A1 * | 8/2017 | Schubert | H04L 67/52 |
| 2018/0041247 | A1 * | 2/2018 | Zakaria | H04B 3/542 |
| 2019/0123933 | A1 * | 4/2019 | Mueller | H04L 49/00 |
| 2019/0310309 | A1 * | 10/2019 | Tart | G01R 31/2801 |
| 2020/0076694 | A1 | 3/2020 | Drury et al. | |
| 2020/0382381 | A1 * | 12/2020 | Prabhu | H04L 41/142 |
| 2020/0387145 | A1 * | 12/2020 | Nixon | G06F 9/3017 |
| 2020/0387149 | A1 * | 12/2020 | Nixon | G05B 19/41865 |
| 2020/0394146 | A1 * | 12/2020 | McLaughlin | G05B 19/0421 |
| 2021/0037045 | A1 * | 2/2021 | Harper | H04L 12/50 |
| 2021/0044490 | A1 * | 2/2021 | Smith | H04L 41/40 |
| 2021/0089008 | A1 * | 3/2021 | Xu | H04L 67/1063 |
| 2022/0417082 | A1 * | 12/2022 | Rahimi Malekshan | G05B 9/03 |
| 2023/0061215 | A1 * | 3/2023 | Mullis | H04L 41/0869 |
| 2023/0061491 | A1 * | 3/2023 | Mullis | H04L 49/351 |
| 2023/0066212 | A1 * | 3/2023 | Mullis | H04L 63/20 |
| 2023/0124264 | A1 * | 4/2023 | Nixon | G06F 9/3017 |
| | | | | 700/99 |
| 2023/0327979 | A1 * | 10/2023 | Mullis | H04L 45/74 |
| | | | | 370/392 |
| 2024/0007233 | A1 * | 1/2024 | Gottwald | H04L 45/28 |
| 2024/0146497 | A1 * | 5/2024 | Smith | H04L 69/28 |
| 2024/0356686 | A1 * | 10/2024 | Pang | H04L 1/22 |
| 2025/0007829 | A1 * | 1/2025 | Nallamothu | G06F 9/45558 |
| 2025/0126014 | A1 * | 4/2025 | Gurfinkel | H04L 41/40 |
| 2025/0220077 | A1 * | 7/2025 | Zhang | H04L 67/1097 |

OTHER PUBLICATIONS

European Patent Office, Extended European Search Report in European Patent Application No. 23207349.4, 11 pp. (Mar. 20, 2024).

* cited by examiner

NETWORK CONFIGURATION IN INDUSTRIAL AUTOMATION SYSTEMS

CROSS-REFERENCE TO RELATED APPLICATIONS

The instant application claims priority to European Patent Application No. 23207349.4, filed Nov. 2, 2023, which is incorporated herein in its entirety by reference.

FIELD OF THE DISCLOSURE

The present disclosure generally relates to methods and systems for network configuration in industrial automation systems.

BACKGROUND OF THE INVENTION

In the field of industrial automation, process control systems typically include at least one network switch which interconnects network devices. Depending on the availability requirements, there is redundancy at the protocol or application level. Current approaches to the configuration of redundancy in network devices are error prone, time-consuming, and vulnerable to compatibility issues. Consequently, proper configuration of network devices assumes increased importance in ensuring the availability of critical components of the process control system.

BRIEF SUMMARY OF THE INVENTION

To better address one or more of these concerns, in a first aspect of the present disclosure, there is provided a method for network configuration in an industrial automation system, the method comprising: obtaining, by a process control system comprising a plurality of network devices each associated with a network switch, network configuration data, wherein the network configuration data identifies at least a redundancy protocol to be used by each of the network devices; and using the network configuration data to configure the network devices, wherein obtaining the network configuration data comprises activating one or more network connections of the network switches as a minimum number of network connections for obtaining the network configuration data, and receiving the network configuration data via the one or more activated network connections.

By receiving the network configuration data via the minimum number of activated network connections, and only by those network connections, the risk of forming undesirable network interconnections that compromise availability can be reduced.

In a second aspect, there is provided a method for network configuration in an industrial automation system, the method comprising: using an engineering tool to compose network configuration data for a process control system comprising a plurality of network devices each associated with a network switch, wherein the network configuration data is usable by the process control system to configure the network devices, and wherein the network configuration data identifies at least a redundancy protocol to be used by each of the network devices; and downloading the network configuration data from the engineering tool to the process control system during a commissioning sequence.

BRIEF DESCRIPTION OF THE SEVERAL VIEWS OF THE DRAWING(S)

DETAILED DESCRIPTION OF THE INVENTION

Figure 1:
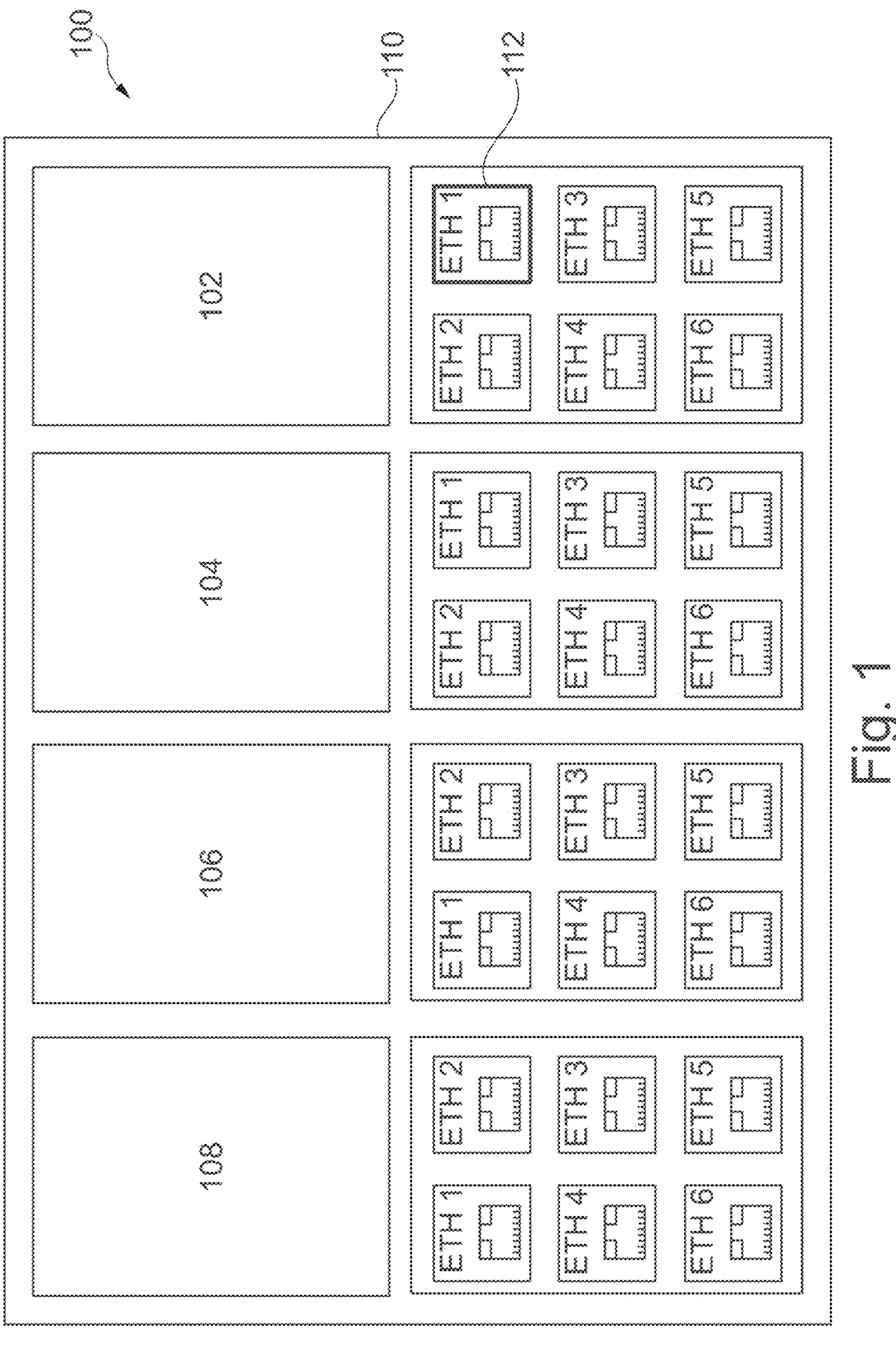
FIG. 1 is a diagram of a process control system in accordance with the disclosure.

FIG. 1 illustrates a process control system 100 for controlling an industrial process carried out by an automation system (not shown). The process control system 100 comprises a plurality of controllers 102-108 physically and communicatively coupled to one another via a mounting termination unit (MTU) 110, which may be described alternatively as a backplane. The mounting termination unit 110 comprises a number of slots for accommodating the controllers 102-108. Each controller 102-108 can be detachably connected to the mounting termination unit 110 via the corresponding slot. The mounting termination unit 110 comprises a bus for communicatively coupling the controllers 102-108 with one another. The mounting termination unit 110 optionally further comprises non-volatile memory which is also coupled to the bus and thereby accessible by the controllers 102-108. The mounting termination unit 110 may further comprise circuitry (not shown) for powering the controllers 102-108 and/or for accommodating a power module.

Each controller 102-108 is configured to control a respective process carried out by the automation system. The process control system 100 may find application in any field of industry where process automation is desired, such as energy, oil and gas, chemical, petrochemical, and so on. Each controller 102-108 handles process control and monitoring for the automation system by receiving input signals from sensors and instruments, and outputting control signals for controlling plant equipment such as pumps, valves, conveyors, mixers, and heaters. Any such sensor, instrument or plant equipment may form part of one or more of field devices. Each controller 102-108 is configured to execute a process control application to generate the control signals on the basis of the input signals. The process control application may comprise control logic instructing the respective controller 102-108 how to respond to input signals with appropriate control signals to maintain normal functioning of the process. In one non-limiting example, the process control application conforms to the international standard IEC 61131. Each controller 102-108 comprises logic circuitry 204 configured to execute the respective process control application. The logic circuitry 204 may comprise a CPU, MCU, SoC, FPGA, DSP, and/or an AI-engine, together with any memory to be used in the processing of signals. The logic circuitry 204 may be further configured to perform any one or more of the other operations described herein.

Each controller 102-108 communicates with other components of the automation system via at least one communications network. To that end, each controller 102-108 is provided with its own network switch and with a plurality of ports, such as that illustrated at 112. In the non-limiting example illustrated in FIG. 1, the ports are Ethernet ports for connecting to at least one Ethernet network. The at least one communications network of the automation system comprises at least one control network. Various other networks may optionally be present, such as at least one fieldbus network, a redundant control network, and/or a "redundancy network" (i.e., an explicit connection between a set of two redundant controllers).

The process control system 100 further uses at least one of the network switches for communication with an engineering tool. The engineering tool, typically implemented as a software package, is used to compose network configuration data for the process control system 100, which is downloaded to the process control system 100 during a commissioning sequence. The network configuration data instructs the network devices in relation to which redundancy protocol to use for implementing redundancy in the automation system.

Since a variety of redundancy protocols or profiles may be used by the network devices (e.g. with one switch in two separate PRP/RNRP networks or in the same network), with those protocols being at least partially incompatible with each other, careful commissioning of networks is important when commissioning a new process control system or expanding an existing one. In one example, the systems and methods described herein may prevent inadvertent creation of a link between two networks in a redundant pair can severely affect communication in both networks. In another example, which does not involve a media redundancy protocol, configuration is carried out to define whether both ports are in the same network (so that other devices can communicate through the switch in the controller) or whether both ports are expected to connect to separate networks (so that other devices cannot communicate through the switch in the controller).

The present disclosure recognizes that activating the minimum number of network connections at the same time during the commissioning sequence can reduce the risk of creating such interconnections. The methods and systems described herein thus configure the network by starting up with as few ports enabled as possible. As shown in FIG. 1, only one external RJ45 for the controller 102 is active. This port therefore serves as the primary configuration port, for receiving a configuration file that is usable for all ports of the process control system 100. The designation of a particular port as primary may be undertaken independently of its later function or relationship with the controller. Unused ports may be disabled.

Figure 2:
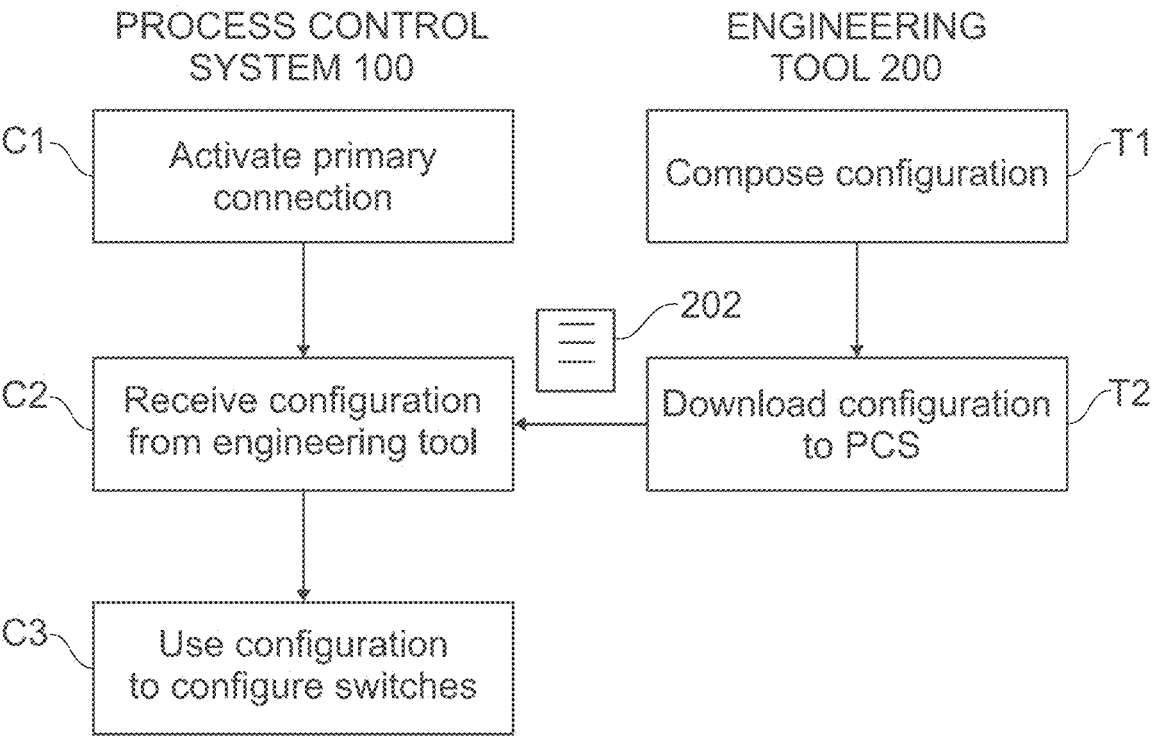
FIG. 2 is flowchart for a method for network configuration in an industrial automation system in accordance with the disclosure.

FIG. 2 is flowchart representing a method for network configuration in an industrial automation system. Configuration may be initiated for example by the engineering tool. In step T1, the engineering tool 200 is used to compose a configuration for the process control system 100. In step C1, the process control system 100 activates a primary network connection for receiving its configuration. In step T2, the engineering tool 200 downloads, to the process control system, a configuration file 200 specifying the configuration for the process control system 100. In step C2, the process control system 100 receives the configuration file. In step C3, the process control system 100 uses the configuration specified in the received configuration file 202 to configure its network devices.

In this way, the multiple controllers 102-108 receive their configuration through the network interface of one controller, even if they are later not in a redundant pair or in any other relation to each other. In the non-limiting example illustrated in FIG. 1, the controllers 104, 106, and 108 receive their configuration from the engineering tool 200 via the internal link to the controller 102 provided by the bus of the MTU 110.

The configuration file 202 may contain network configuration data specifying the following:

Port routing: enabled/disabled ports, MUX settings;

Redundancy protocols (one-per network switch), e.g., Parallel Redundancy Protocol (PRP), Redundant Network Routing Protocol (RNRP), High-availability Seamless Redundancy (HSR), or Media Redundancy Protocol (MRP);

Logical network assignment, e.g., promote network interface eth0 of the processor and/or eth1 of the processor to become control network.

The configuration file 202 may contain any further data necessary for commissioning or network configuration. The configuration file 202 may contains the configuration for the complete process control system 100 or, when applying remote redundancy, for two process control systems of a redundant pair, to ensure consistency.

One or more of the controllers 102-108 may then store the configuration file 202 in internal non-volatile storage and/or in non-volatile storage of the MTU 110, to simplify device replacement and subsequent reboots.

Numerous variations to the systems and methods described herein may be envisaged. For example, although the controllers 102-108 are described herein as comprising embedded switches, it will be understood that the methods and systems described herein are equally applicable in the case that the controllers and network switches are implemented in separate units, with the network switch comprising part of a network adapter, for example.

In one variant, the slots for accommodating the controllers 102-108 form part of a separate inlay rather than the mounting termination unit, where the inlay is itself couplable to the mounting termination unit. The inlay may be used to adapt the MTU 110 to specific controller variants. The inlay may further comprise any of the components or functionality attributed by the present disclosure to the MTU 110, such as the bus, the non-volatile memory, and/or data processing circuitry for performing any of the steps of the methods described herein as involving the MTU 110.

In a further variant, when commissioning daisy-chained process control systems, in which a configuration is required for all process control systems in the chain, a default network configuration ensuring availability of the primary network connection is enabled by using a sequence of pushes on a button for switching ports during the commissioning sequence.

Figure 3:
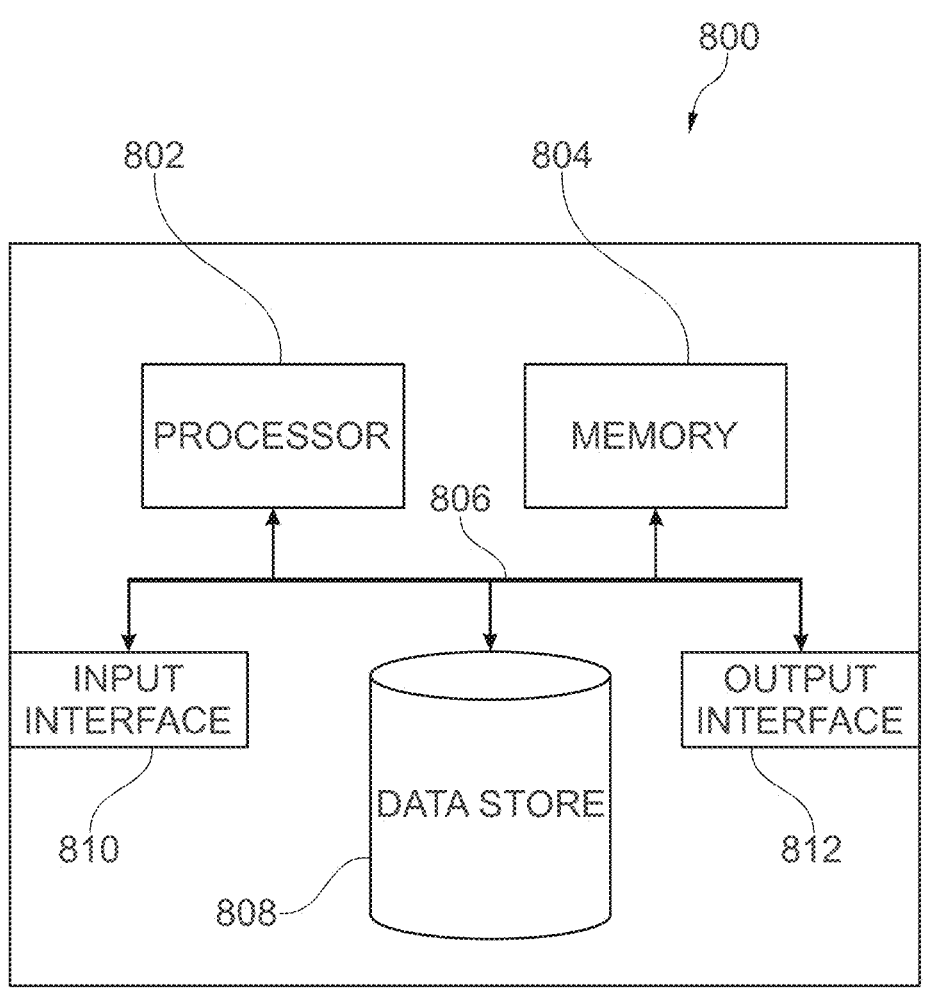
FIG. 3 is a chart of a computing system that can be used in accordance with the systems and methods disclosed herein.

FIG. 3 illustrates an exemplary computing system 800 that can be used in accordance with the systems and methods disclosed herein. The computing system 800 may form part of or comprise any desktop, laptop, server, or cloud-based computing system. The computing system 800 includes at least one processor 802 that executes instructions that are stored in a memory 804. The instructions may be, for instance, instructions for implementing functionality described as being carried out by one or more components described herein or instructions for implementing one or more of the methods described herein. The processor 802 may access the memory 804 by way of a system bus 806. In addition to storing executable instructions, the memory 804 may also store conversational inputs, scores assigned to the conversational inputs, etc.

The computing system 800 additionally includes a data store 808 that is accessible by the processor 802 by way of the system bus 806. The data store 808 may include executable instructions, log data, etc. The computing system 800 also includes an input interface 810 that allows external devices to communicate with the computing system 800. For instance, the input interface 810 may be used to receive instructions from an external computer device, from a user, etc. The computing system 800 also includes an output interface 812 that interfaces the computing system 800 with one or more external devices. For example, the computing system 800 may display text, images, etc. by way of the output interface 812.

It is contemplated that the external devices that communicate with the computing system 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing system 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing system 800 may be a distributed system. Thus, for instance, several devices may be in communication by way of a network connection and may collectively perform tasks described as being performed by the computing system 800.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed by a computer. By way of example, and not limitation, such computer-readable storage media can comprise FLASH storage media, RAM, ROM, EEPROM, CD-ROM or other optical disc storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal may be included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include field-programmable gate arrays (FP-GAs), application-specific integrated circuits (ASICs), application-specific standard products (ASSPs), system-on-chip systems (SOCs), complex programmable logic devices (CPLDs), etc.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The mere fact that certain measures are recited in mutually different dependent claims does not indicate that a combination of these measures cannot be used advantageously.

Any reference signs in the claims should not be construed as limiting the scope.

In accordance with the embodiments described herein, activating the network connections may comprise enabling only those ports corresponding to the network connections to be activated. Any other ports present in the process control system may be disabled, for further certainty. More particularly, enabling only those ports corresponding to the network connections to be activated may comprise enabling only those exposed ports corresponding to the network connections to be activated, and optionally disabling the other exposed ports, wherein each network device comprises at least one exposed port for establishing network connections with components of the automation system that are external to the process control system and at least one non-exposed port for establishing connections with components that are internal to the process control system. For example, a first network device may enable an exposed port for receiving the network configuration data, while also enabling at least one non-exposed port for internally connecting to a second network device, while the second network device similarly enables a non-exposed port for connecting to the first network device to receive the configuration data therefrom.

In many cases, the minimum number of network connections to be activated is one, such that only a single network connection is activated, which is associated with a single controller. The one or more network connections to be activated may be predesignated as primary network connections, for example using a default switch configuration, such that they may be used by the process control system and by an engineering tool during a commissioning sequence. The designation of one or more network connections as primary may be adapted according to circumstances so as to implement a floating primary network connection. For example, a floating primary network connection may be beneficial in the case that a network device attempts to obtain an IP address via DHCP (Dynamic Host Configuration Protocol). The network device may attempt to contact a DHCP server N-times. In case no answer is received, the network device may change the primary network connection. It will be understood that the minimum number of network connections are those which are to be activated at the same time for receiving the network configuration data during the commissioning sequence and that, following commissioning, other network connections may become active during normal operation.

The redundancy protocols to be used by the network devices may vary. In particular, the network configuration data may be usable to configure a first network device to use a first redundancy protocol and a second network device to use a second redundancy protocol, wherein the first and second redundancy protocols are at least partially incompatible. In such cases, activating only the minimum number of network connections provides particular utility in reducing the risk of undesirable interconnections being formed as a consequence of the incompatibility between the redundancy protocols.

Once the network configuration data has been received by the process control system, appropriate action is taken to use it to configure any network devices which need to be configured. Configuring a network device using the network configuration data may comprise configuring at least one processor and/or at least one network switch of that network device. In one example, a first network device of the plurality of network devices receives the network configuration data via the one or more activated network connections and uses the network configuration data to configure itself (including for example the network switch associated therewith and/or its processor) as well as one or more of the other network devices in the process control system. In another example, the first network device receives the network configuration data, uses the network configuration data to configure itself, and forwards the network configuration data to one or more of the other network devices in the process control system, which then use the network configuration data to configure themselves. Communication between network devices within the process control system may take place via one or more interconnects, such as a bus, in the mounting termination unit. To that end, each network device may comprise at least one non-exposed port for connecting to the one or more interconnects, as discussed hereinabove.

The process control system may further use the network configuration data for remote configuration of one or more other process control systems, so as to implement remote redundancy. For example, the process control system, as a first process control system, may forward the received network configuration data to a second process control system, wherein the network configuration data comprises network configuration data pertaining also to the second process control system.

The network configuration data, once received, may be stored in non-volatile memory in the process control system.

The non-volatile memory may form part of one or more of the controllers. Additionally or alternatively, the non-volatile memory may form part of the mounting termination unit.

The network configuration data for all network devices of the process control system may be provided and received in the form of a single configuration file, to ensure consistency of the configuration. Alternatively, the network configuration data for all network devices of the process control system may be provided and received by way of multiple configuration files, with the multiple configuration files comprising for example one file for each redundant network pair. Where the network configuration data is received by way of multiple configuration files, the process control system may perform a consistency check to ensure consistency of the configuration described by the multiple configuration files. Additionally or alternatively, consistency of the configuration may be taken as being ensured by virtue of the fact that the multiple configuration files were created using the same engineering tool.

The method may further comprise undertaking one or more sanity checks or verification processes in relation to the received network configuration data and/or the configuration described therein, before, during, and/or after the commissioning sequence.

In a second aspect, there is provided a method for network configuration in an industrial automation system, the method comprising: using an engineering tool to compose network configuration data for a process control system comprising a plurality of network devices each associated with a network switch, wherein the network configuration data is usable by the process control system to configure the network devices, and wherein the network configuration data identifies at least a redundancy protocol to be used by each of the network devices; and downloading the network configuration data from the engineering tool to the process control system during a commissioning sequence.

The network configuration data may be downloaded to the process control system via a minimum number of network connections activated for that purpose by the process control system, in the manner described elsewhere herein.

There is also provided a method for network configuration in an industrial automation system, the method comprising carrying out the methods of both the first and second aspects.

The method of the first and/or second aspect may be computer implemented. Any of the methods described herein may form part of a method of producing a product using the industrial automation system, and/or a method of controlling the industrial automation system to carry out a production process for producing the product.

According to a third aspect, there is provided a data processing system configured to perform the method of the first and/or second aspect. The data processing system may comprise, or be comprised in, a computing system as described herein. In the case that the data processing system performs the method of the first aspect, the data processing system may comprise, or be comprised in, a process control system as described herein, or a network device for a process control system as described herein. That network device may comprise for example a controller as described herein or a network adapter. The data processing system may alternatively comprise, or be comprised in, a mounting termination unit (MTU) or backplane, or an inlay for the MTU, wherein the inlay serves to provide physical and communicative coupling between the MTU and modules such as controllers. In the case that the data processing system performs the method of the second aspect, the data processing system may comprise, or be comprised in, an engineering server which executes the engineering tool as described herein. There is also provided by the present disclosure an automation system comprising the data processing system of the third aspect.

According to a fourth aspect, there is provided a computer program (product) comprising instructions which, when executed by a computing system, enable or cause the computing system to perform the method of the first and/or second aspect.

According to a fifth aspect, there is provided a computer-readable (storage) medium comprising instructions which, when executed by a computing system, enable or cause the computing system to perform the method of the first and/or second aspect. The computer-readable medium may be transitory or non-transitory, volatile or non-volatile.

The systems and methods described herein provide a strategy for commissioning or extending a network of an automation system without interfering with existing operational control networks and without linking any redundant network to a network which the redundant network is intended to replace in the event of failure. The systems and methods described herein mitigate the need for individual commissioning of network devices such as controllers that use different redundancy protocols. The systems and methods described herein provide for simplified network device commissioning, reduced risks to adjacent Ethernet-connected devices, and enforced separation of redundant networks.

By "process control system" is meant any system for controlling an industrial process carried out by an automation system. The process control system may comprise a number of network devices physically and communicatively coupled to one another via a mounting termination unit, where the network devices typically include at least one controller.

By "network device" is meant any device which uses a network switch to connect to at least one network of an industrial automation system. That network device module may comprise for example a controller as described herein, or a network adapter, for example.

The "controller" as described herein may comprise hardware, firmware, and/or software configured to perform any of the operations or algorithms described herein and may be described alternatively as a control module or control unit. Hardware may comprise, singly or in any combination, hardwired circuitry, programmable circuitry such as computer processors comprising one or more individual instruction processing cores, or state machine circuitry. Firmware may be embodied as code, instructions and/or data stored or hardcoded in memory devices (e.g., non-volatile memory devices). Software may be embodied as a software package, code, instructions and/or data recorded on at least one transitory or non-transitory computer readable storage medium.

By "automation system" is meant herein an industrial plant or production plant comprising one or more pipelines, production lines, and/or assembly lines for transforming one or more educts into a product and/or for assembling one or more components into a final product.

The term "configuration data" or "configuration" as used herein refers to data which is used to configure a network device so as to enable the network device to access the network and/or use network equipment. The configuration data may thus be usable to configure at least one processor and/or at least one network switch of the network device. In particular, the configuration data may comprise data instructing the network device in relation to which redundancy protocol to use. The configuration data may contain further configuration data such as that concerning routing and/or interface assignment.

By "redundant" or "redundancy" is meant a protocol or mechanism that adds extra components or functionality to maintain reliable operation despite failure. Using component redundancy, for example, the component in question represents one of two or more identical or similar components which are included to ensure availability in the case that one of them malfunctions. Network redundancy allows a network to continue running after a subnet failure by switching communication to a second subnet. Media redundancy establishes a secondary connection to the network which is used in case the primary connection fails, for example using a ring topology.

Reference made herein to a network device being "associated" with a network switch may be understood to mean that the network device and the network switch are integrated together within the same unit or that a separate network adapter comprising the network switch is provided for use by the network device, for example by a standalone controller.

The term "obtaining", as used herein, may comprise, for example, receiving from another system, device, or process; receiving via an interaction with a user; loading or retrieving from storage or memory; measuring or capturing using sensors or other data acquisition devices.

The term "determining", as used herein, encompasses a wide variety of actions, and may comprise, for example, calculating, computing, processing, deriving, investigating, looking up (e.g., looking up in a table, a database or another data structure), ascertaining, and the like. Also, "determining" may comprise receiving (e.g., receiving information), accessing (e.g., accessing data in a memory), and the like. Also, "determining" may comprise resolving, selecting, choosing, establishing and the like.

The indefinite article "a" or "an" does not exclude a plurality. In addition, the articles "a" and "an" as used herein should generally be construed to mean "one or more" unless specified otherwise or clear from the context to be directed to a singular form.

Unless specified otherwise, or clear from the context, the phrases "one or more of A, B and C", "at least one of A, B, and C", and "A, B and/or C" as used herein are intended to mean all possible permutations of one or more of the listed items. That is, the phrase "A and/or B" means (A), (B), or (A and B), while the phrase "A, B, and/or C" means (A), (B), (C), (A and B), (A and C), (B and C), or (A, B, and C).

The term "comprising" does not exclude other elements or steps. Furthermore, the terms "comprising", "including", "having" and the like may be used interchangeably herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for network configuration in an industrial automation system, the method comprising:

obtaining, by a process control system comprising a plurality of network devices each associated with a network switch, network configuration data, wherein the network configuration data identifies at least a redundancy protocol to be used by each of the network devices; and using the network configuration data to configure the network switches, wherein obtaining the network configuration data comprises activating one or more network connections of the network switches as a minimum number of network connections for obtaining the network configuration data, and receiving the network configuration data via the one or more activated network connections;

wherein activating the network connections comprises enabling only ports corresponding to the network connections to be activated;

wherein the network configuration data is usable to configure a first network device to use a first redundancy protocol and a second network device to use a second redundancy protocol, wherein the first and second redundancy protocols are at least partially incompatible; and wherein communication between the network devices within the process control system takes place via one or more interconnects in a mounting termination unit of the process control system.

2. The method of claim 1, further comprising disabling one or more other ports present in the process control system.

3. The method of claim 1, wherein the one or more network connections to be activated are predesignated as primary network connections.

4. The method of claim 3, wherein the designation of the one or more network connections as primary is adapted according to circumstances.

5. The method of claim 1, wherein a first network device of the plurality of network devices receives the network configuration data via the one or more activated network connections and uses the network configuration data to configure itself as well as one or more of the other network devices in the process control system.

6. The method of claim 1, wherein a first network device of the plurality of network devices receives the network configuration data via the one or more activated network connections, uses the network configuration data to configure itself, and forwards the network configuration data to one or more of the other network devices in the process control system, which then use the network configuration data to configure themselves.

7. The method of claim 1, wherein the process control system further uses the network configuration data for remote configuration of one or more other process control systems.

8. The method of claim 7, wherein the process control system, as a first process control system, forwards the received network configuration data to a second process control system, wherein the network configuration data comprises network configuration data pertaining also to the second process control system.

9. The method of claim 1, wherein the network configuration data for all network devices of the process control system is received in a single configuration file.

10. A method for network configuration in an industrial automation system, the method comprising:

using an engineering tool to compose network configuration data for a process control system comprising a plurality of network devices each associated with a network switch, wherein the network configuration data is usable by the process control system to configure the network devices, and wherein the network configuration data identifies at least a redundancy protocol to be used by each of the network devices; and downloading the network configuration data from the engineering tool to the process control system during a commissioning sequence, wherein the network configuration data is downloaded to the process control system via a minimum number of network connections activated for that purpose by the process control system wherein activating the network connections comprises enabling only ports corresponding to the network connections to be activated;

wherein the network configuration data is usable to configure a first network device to use a first redundancy protocol and a second network device to use a second redundancy protocol, wherein the first and second redundancy protocols are at least partially incompatible; and wherein communication between the network devices within the process control system takes place via one or more interconnects in a mounting termination unit of the process control system.

* * * * *